United States Patent
Hahn et al.

(10) Patent No.: US 9,386,456 B2
(45) Date of Patent: Jul. 5, 2016

(54) METHOD AND APPARATUS FOR TRANSMITTING INDICATION OF CELL STATE IN WIRELESS COMMUNICATION SYSTEM

(71) Applicant: LG ELECTRONICS INC., Seoul (KR)

(72) Inventors: Gene Beck Hahn, Seoul (KR); Jae Hoon Chung, Seoul (KR); Hye Young Choi, Seoul (KR); Eun Jong Lee, Seoul (KR); Hee Jeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 14/156,240

(22) Filed: Jan. 15, 2014

(65) Prior Publication Data

US 2014/0199982 A1    Jul. 17, 2014

Related U.S. Application Data

(60) Provisional application No. 61/752,982, filed on Jan. 16, 2013, provisional application No. 61/757,713, filed on Jan. 29, 2013.

(51) Int. Cl.
| | |
|---|---|
| *H04W 72/00* | (2009.01) |
| *H04W 16/02* | (2009.01) |
| *H04W 52/02* | (2009.01) |
| *H04W 16/32* | (2009.01) |

(52) U.S. Cl.
CPC .......... *H04W 16/02* (2013.01); *H04W 52/0206* (2013.01); *H04W 16/32* (2013.01)

(58) Field of Classification Search
CPC ......................... H04W 8/245; H04M 1/72525
USPC ........................................ 455/418, 522, 453
See application file for complete search history.

(56) References Cited

U.S. PATENT DOCUMENTS

| | | | | |
|---|---|---|---|---|
| 2013/0244669 A1* | 9/2013 | Das | .................. | H04W 24/02 455/446 |
| 2014/0011534 A1* | 1/2014 | Dimou | .................. | H04W 16/08 455/522 |
| 2015/0011232 A1* | 1/2015 | Zhang | .................. | H04W 16/08 455/453 |

* cited by examiner

*Primary Examiner* — Chuck Huynh
(74) *Attorney, Agent, or Firm* — Lee, Hong, Degerman, Kang & Walmey; Jonathan Kang; Michael Monaco

(57) ABSTRACT

A method and apparatus for transmitting an expanding request in a wireless communication system is provided. A first cell transmits an expanding request, which includes a cell off state indication which indicates the first cell is going to be turned off, and a cell off timer, to a second cell, receives an expanding request acknowledge as a response to the expanding request from the second cell, and turns off power. Alternatively, a method and apparatus for transmitting a shrinking request in a wireless communication system is provided. The first cell transmits a shrinking request, which includes a cell on state indication which indicates the first cell is going to be turned on, and a cell on timer, to a second cell, receives a shrinking request acknowledge as a response to the shrinking request from the second cell, and turns on power.

6 Claims, 13 Drawing Sheets

METHOD AND APPARATUS FOR TRANSMITTING INDICATION OF CELL STATE IN WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Ser. Nos. 61/752,982 filed on Jan. 16, 2013, and 61/757,713, filed on Jan. 29, 2013, the contents of which are hereby incorporated by reference herein in their entirety.

BACKGROUND OF THE INVENTION

1. Field of the Invention

The present invention relates to wireless communications, and more specifically, to a method and apparatus for transmitting an indication of a cell state in a wireless communication system.

2. Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for 3GPP LTE will focus on additional functionalities for enhanced performance in hotspot areas for indoor and outdoor using low power nodes.

Currently, it is expected that the trend of mobile wireless networks will be toward the denser deployment of small cells for capacity enhancement. By increasing the number of small cells, end-users can be physically located closer to the network and therefore, the data capacity would be significantly improved. However, when considering the deployment of large number of small cells, some technical issues made from the differences between small cell deployment and macro cell deployment should be carefully identified and solved. As an example, though the turn on/off of macro cells is an important characteristic for macro cell deployment in terms of energy saving, such an aspect should also be further emphasized for small cell deployment. The reason is that the dynamic turn on/off of large number of small cells might have some RAN impacts.

A method for indicating cell on/off states between small cells may be required.

SUMMARY OF THE INVENTION

The present invention provides a method and apparatus for transmitting an indication of a cell state in a wireless communication system. The present invention provides a method for transmitting a request for expanding coverage when a cell decides that it is going to be turned off. The present invention provides a method for transmitting a request for shrinking coverage when a cell decides that it is going to be turned on.

In an aspect, a method for transmitting, by a first cell, an expanding request in a wireless communication system is provided. The method includes transmitting an expanding request, which includes a cell off state indication which indicates the first cell is going to be turned off, and a cell off timer, to a second cell, receiving an expanding request acknowledge as a response to the expanding request from the second cell, and turning off power.

The expanding request may further include time at which the turning off power starts.

The method may further include transmitting information on a type of the first cell to the second cell via X2 interface.

The cell off timer may start when the turning off power starts.

The method may further include receiving an expanding start indication from the second cell when the second cell starts expanding coverage of the second cell according to the expanding request.

The method may further include receiving an expanding complete indication from the second cell when the second cell finishes expanding coverage of the second cell.

The turning off power may start after the second cell finishes expanding coverage of the second cell.

The method may further include transmitting a cell off start indication to the second cell when the turning off power starts.

The method may further include transmitting a cell off complete indication to the second cell when the turning off power finishes.

The first cell and the second cell may be small cells.

In another aspect, a method for transmitting, by a first cell, a shrinking request in a wireless communication system is provided. The method includes transmitting a shrinking request, which includes a cell on state indication which indicates the first cell is going to be turned on, and a cell on timer, to a second cell, receiving a shrinking request acknowledge as a response to the shrinking request from the second cell, and turning on power.

The shrinking request may further include time at which the turning on power starts.

The method may further include transmitting information on a type of the first cell to the second cell via X2 interface.

The cell on timer may start when the turning on power starts.

The method may further include transmitting a cell on start indication to the second cell when the turning on power starts.

The method may further include transmitting a cell on complete indication to the second cell when the turning on power finishes.

The method may further include receiving a shrinking start indication from the second cell when the second cell starts shrinking coverage of the second cell according to the shrinking request.

The method may further include receiving a shrinking complete indication from the second cell when the second cell finishes shrinking coverage of the second cell.

The turning on power may finish before the second cell starts shrinking coverage of the second cell.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
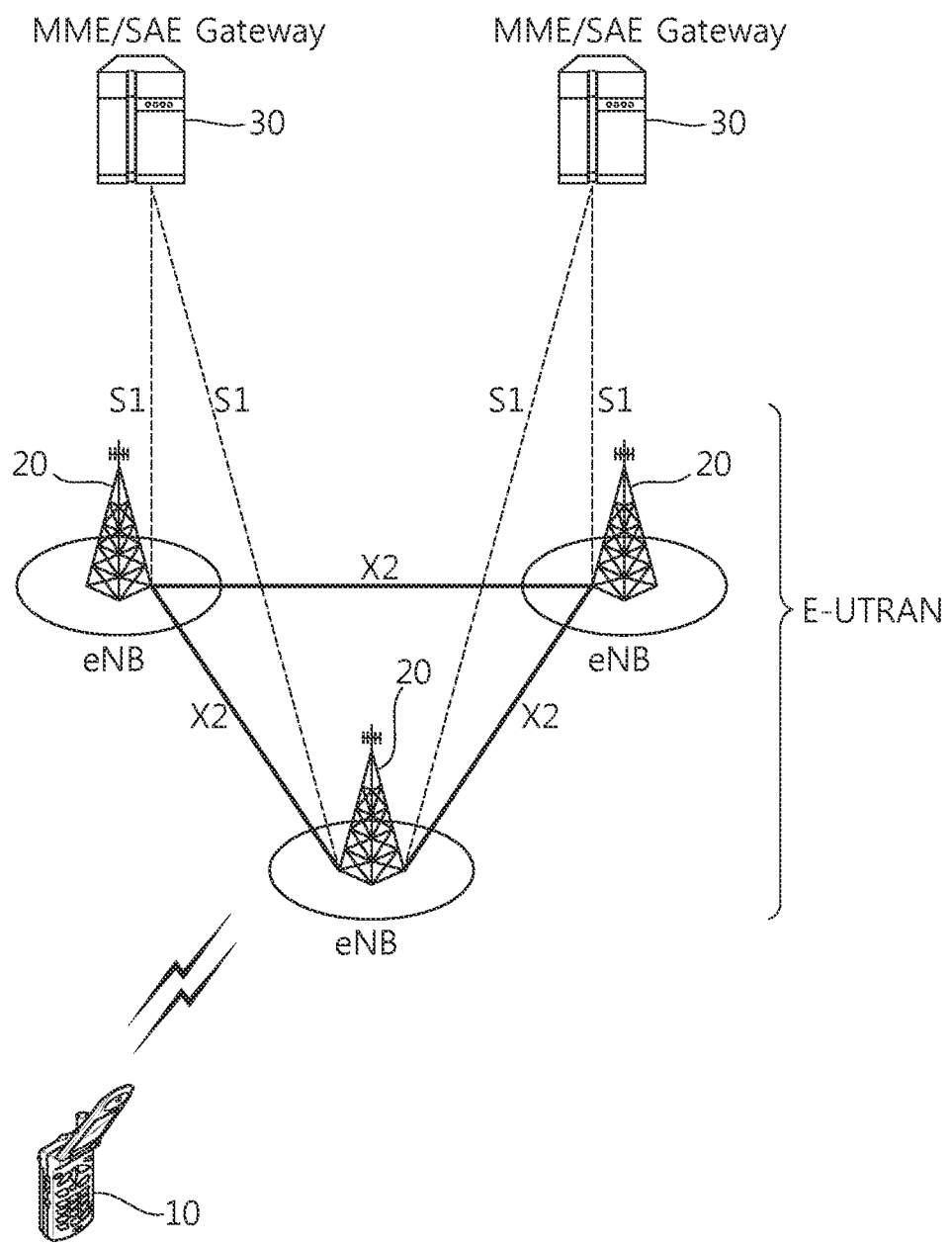
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
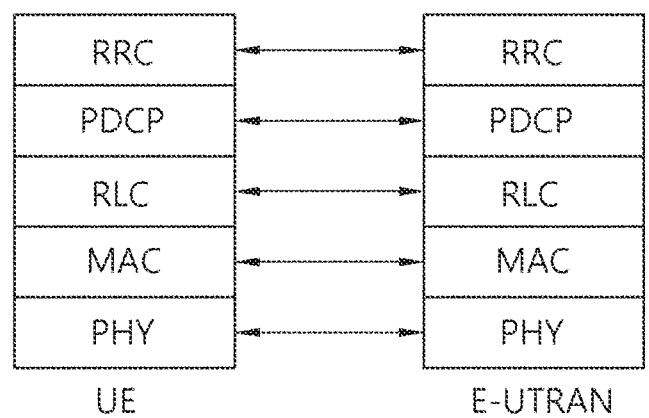
FIG. 2 shows a control plane of a radio interface protocol of an LTE system.
Figure 3:
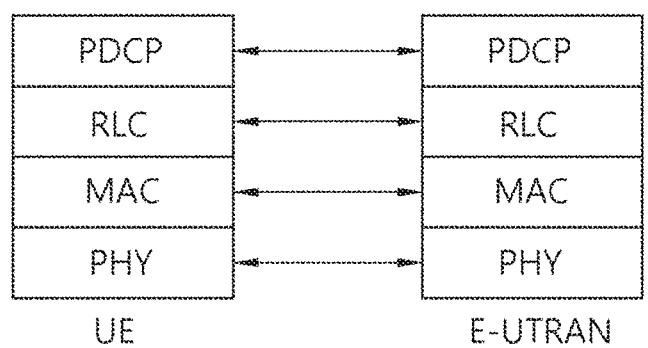
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
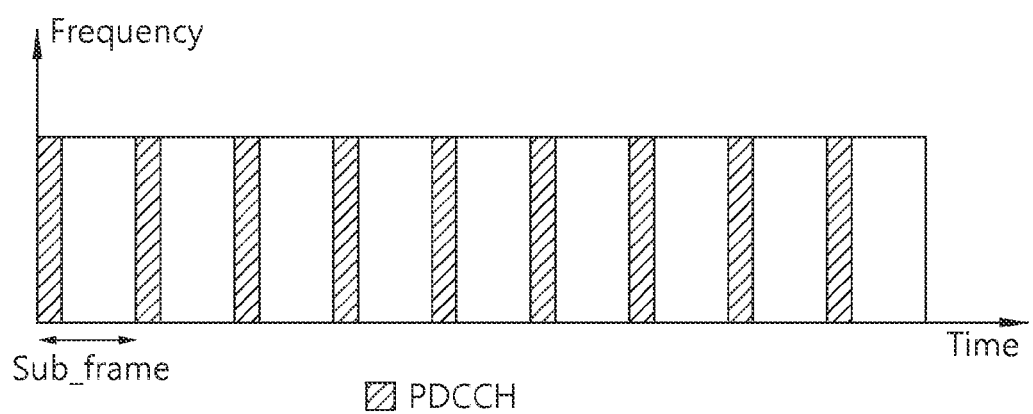
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A cell is combination of DL resources and optionally UL resources. The linking between the carrier frequency of the DL resources and the carrier frequency of the UL resources is indicated in the system information on the DL resources.

Small cell enhancement is described. It may be referred to 3GPP TR 36.932 V12.0.0 (2012-12).

Figure 5:
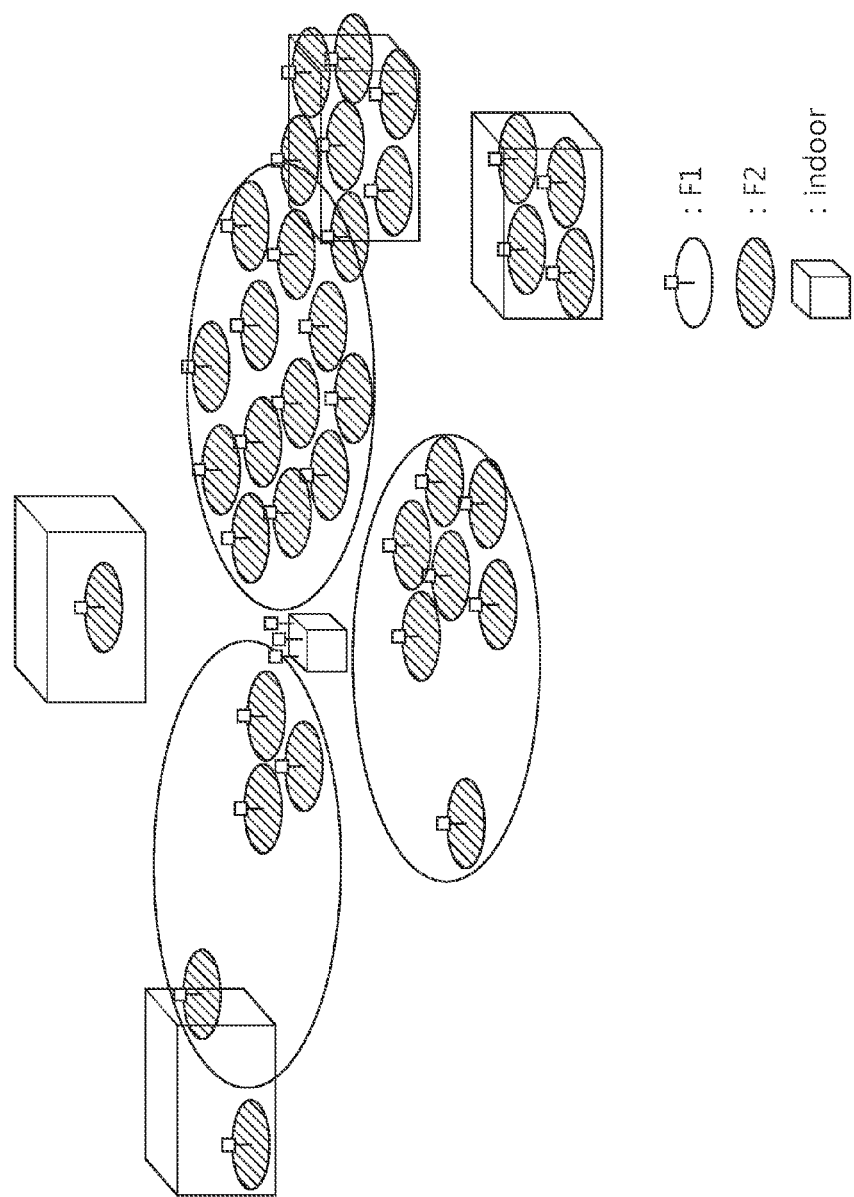
FIG. 5 shows deployment scenarios of small cells with/without macro coverage.

FIG. 5 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell enhancement should address the deployment scenario in which different frequency bands are separately assigned to macro layer and small cell layer, respectively, where F1 and F2 in FIG. 5 correspond to different carriers in different frequency bands.

Small cell enhancement should be applicable to all existing and as well as future cellular bands, with special focus on higher frequency bands, e.g., the 3.5 GHz band, to enjoy the more available spectrum and wider bandwidth.

Small cell enhancement should also take into account the possibility for frequency bands that, at least locally, are only used for small cell deployments.

Co-channel deployment scenarios between macro layer and small cell layer should be considered as well.

Some example spectrum configurations are:

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer One potential co-channel deployment scenario is dense outdoor co-channel small cells deployment, considering low mobility UEs and non ideal backhaul. All small cells are under the Macro coverage.

Small cell enhancement should be supported irrespective of duplex schemes (FDD/TDD) for the frequency bands for macro layer and small cell layer. Air interface and solutions for small cell enhancement should be band-independent, and aggregated bandwidth per small cell should be no more than 100 MHz.

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain should be considered. Non-full buffer and full buffer traffic are both included, and non-full buffer traffic is prioritized to verify the practical cases.

Backward compatibility, i.e., the possibility for legacy (pre-Release 12) UEs to access a small-cell node/carrier, is desirable for small cell deployments.

The introduction of non-backwards compatible features should be justified by sufficient gains.

Support for energy saving is described. It may be referred to 3GPP TS 36.300 V11.4.0 (2012-12).

The aim of the energy saving is to reduce operational expenses. The energy saving allows, for example in a deployment where capacity boosters can be distinguished from cells providing basic coverage, to optimize energy consumption enabling the possibility for the E-UTRAN cell providing additional capacity, to be switched off when its capacity is no longer needed and to be re-activated on a need basis. The basic coverage may be provided by E-UTRAN, UTRAN or GERAN cells.

The solution builds upon the possibility for the eNB owning a capacity booster cell to autonomously decide to switch-off such cell to lower energy consumption (dormant state). The decision is typically based on cell load information, consistently with configured information. The switch-off decision may also be taken by operation and management (O&M).

The eNB may initiate handover actions in order to off-load the cell being switched off and may indicate the reason for handover with an appropriate cause value to support the target node in taking subsequent actions, e.g., when selecting the target cell for subsequent handovers.

All peer eNBs are informed by the eNB owning the concerned cell about the switch-off actions over the X2 interface, by means of the eNB configuration update procedure. The eNB indicates the switch-off action to a GERAN and/or UTRAN node by means of the eNB direct information transfer procedure over S1.

All informed nodes maintain the cell configuration data, e.g., neighbur relationship configuration, also when a certain cell is dormant. If basic coverage is ensured by E-UTRAN cells, eNBs owning non-capacity boosting cells may request a re-activation over the X2 interface if capacity needs in such cells demand to do so. This is achieved via the cell activation procedure. If basic coverage is ensured by UTRAN or GERAN cells, the eNB owning the capacity booster cell may receive a re-activation request from a GERAN or UTRAN node by means of the MME direct information transfer procedure over S1. The eNB owning the capacity booster cell may also receive from the sending GERAN or UTRAN node the minimum time before that cell switches off. During this time, the same eNB may prevent idle mode UEs from camping on the cell and may prevent incoming handovers to the same cell.

The eNB owning the dormant cell should normally obey a request. The switch-on decision may also be taken by O&M. All peer eNBs are informed by the eNB owning the concerned cell about the re-activation by an indication on the X2 interface. The eNB indicates the re-activation action to a GERAN and/or UTRAN node by means of the eNB direct information transfer procedure over S1. The eNB owning the concerned cell may choose to delay or not to send indication(s) if the sending GERAN or UTRAN node has included the minimum activation time in the re-activation request.

Figure 6:
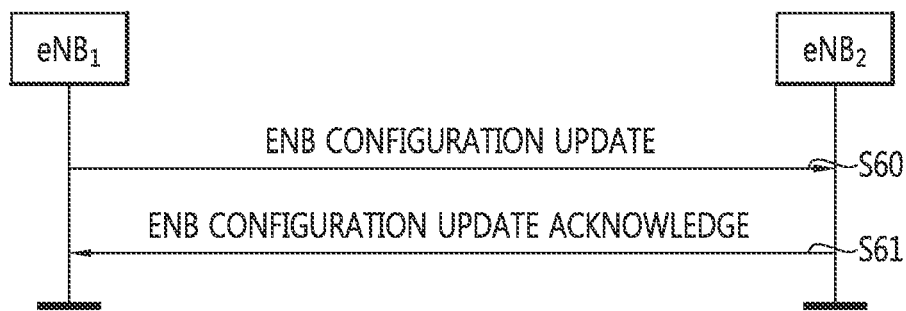
FIG. 6 shows an eNB configuration update procedure for energy saving.

FIG. 6 shows an eNB configuration update procedure for energy saving. It may be referred to Section 8.3.5 of 3GPP TS 36.423 V11.2.0 (2012-09). The purpose of the eNB configuration update procedure is to update application level configuration data needed for two eNBs to interoperate correctly over the X2 interface. The eNB configuration update procedure uses non UE-associated signaling.

Referring to FIG. 6, in step S60, an eNB1 initiates the eNB configuration update procedure by sending an eNB configuration update message to a peer eNB2. The eNB configuration update message shall include an appropriate set of up-to-date configuration data, including, but not limited to, the complete lists of added, modified and deleted served cells, that the eNB1 has just taken into operational use.

Upon reception of the eNB configuration update message, the eNB2 shall update the information for the eNB1. After successful update of requested information, in step S61, the eNB2 shall reply with an eNB configuration update acknowledge message to inform the eNB1 that the requested update of application data was performed successfully.

When considering the deployment of future dense small cells, dynamic on/off of small cells may be considered as one of the features of such deployment. To achieve the dynamic on/off of small cells, current X2 procedure needs to be enhanced.

Hereinafter, cell on/off states indication procedure between small cells according to an embodiment of the present invention is described. According to an embodiment of the present invention, the network may control expansion/shrinkage of a small cell based on information transmitted from a neighbor small cells that are going to be turned on or turned off. Such information may contain period of turning on/off, timing of turning on/off, etc.

Figure 7:
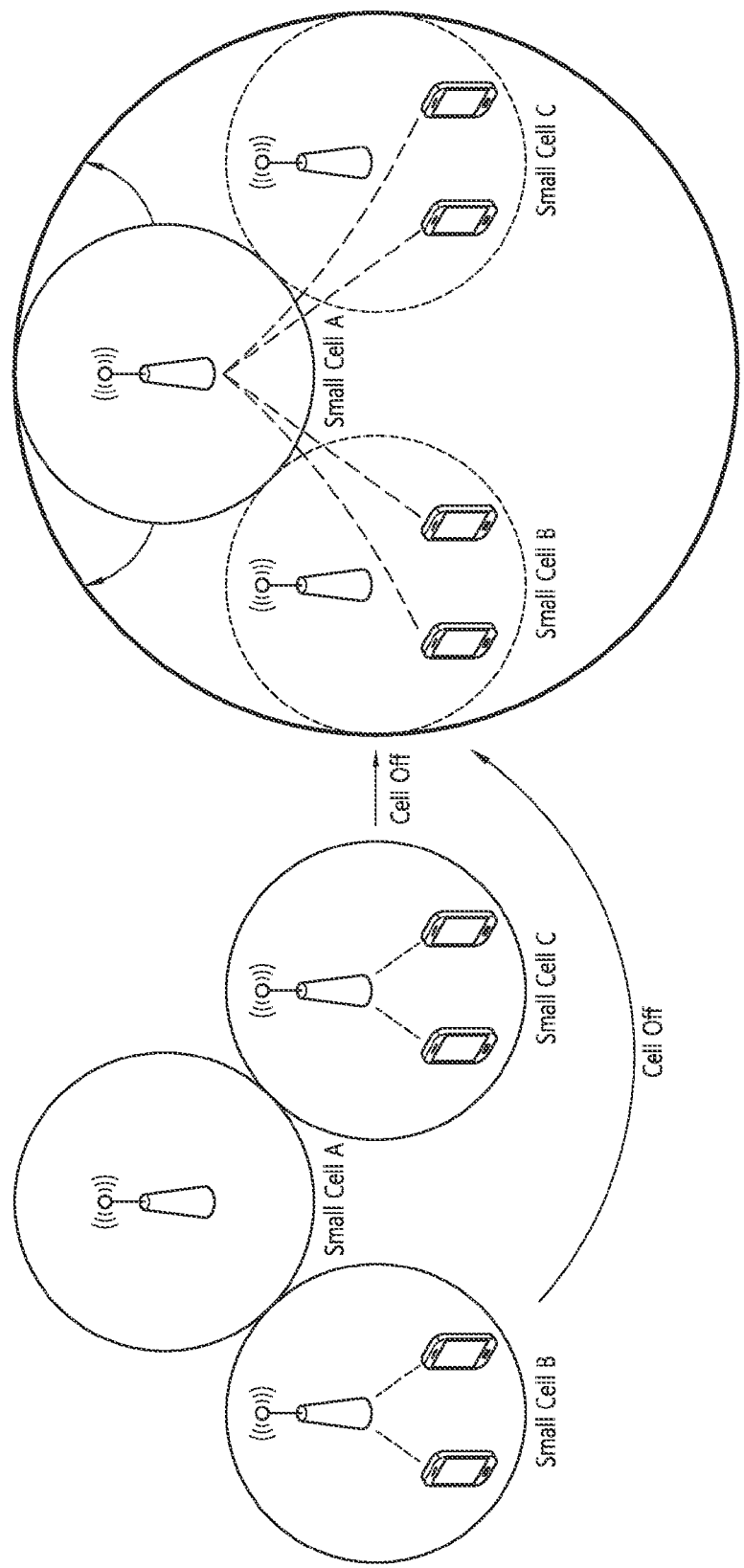
FIG. 7 shows an example of a deployment scenario of standalone small cells with dynamic turn on/off states according to an embodiment of the present invention.

FIG. 7 shows an example of a deployment scenario of standalone small cells with dynamic turn on/off states according to an embodiment of the present invention.

Referring to FIG. 7, there are 3 small cells, i.e., small cell A, small cell B, and small cell C. It is assumed that that the small cell B and small cell C are going to be turned off. In such case, the small cell A should expand its coverage to accommodate UEs served by the small cell B and small cell C. On the contrary, if the small cell B and small cell C are going to be turned on again, the small cell A, whose coverage is expanded, should shrink its own coverage to leave the UEs back to the original small cell B and small cell C.

For dynamic turn on/off of small cells, the small cell that is going to be turned off should notify its state change in the near future to the small cell that should expand its coverage and accommodate UEs on behalf of the small cell that will be turned off soon. Conversely, the small cell that is going to be turned on again should notify its state changes in the near future to the small cell that should shrink its coverage and leave the UEs back to the small cell that will be turned on again. Hereinafter, for convenience, the small cell that is going to be turned off or going to be turned on is called a first type cell or on-and-off cell. And, the small cell that should expand or shrink its coverage is called a second type cell or shrink-and-expand cell.

The first type cell and second type cell needs to be distinguished. For example, the first type cell and second type cell may be distinguished by using the currently defined X2 procedure, e.g., X2 setup procedure. More specifically, the type of a cell, i.e., on-and-off or shrink-and-expand, may be added to X2 setup messages as an information element (IE) of served cell Information. Accordingly, the network may know which cell can act as the first type cell and may also know which cell can act as the second cell. The type of cell may be informed to the neighbor cells by other X2 procedure such as the eNB configuration update procedure, etc.

Figure 8:
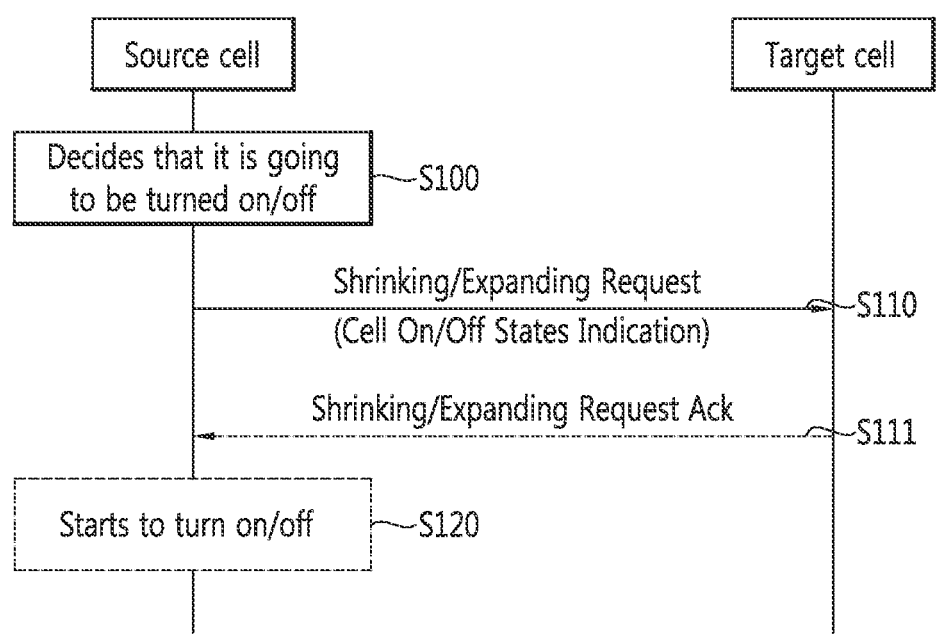
FIG. 8 shows an example of a dynamic cell turn on/off procedure according to an embodiment of the present invention.

FIG. 8 shows an example of a dynamic cell turn on/off procedure according to an embodiment of the present invention.

In step S100, a source cell, which is the first type cell or on-and-off cell described above, decides that it is going to be turned off soon, or decides that it will be turned on soon again.

If the source cell decides that it is going to be turned off soon, in step S110, the source cell transmits an expanding request to a target cell that has a role to expand its coverage, i.e., the second type cell or shrink-and-expand cell described above, for UEs served by the source cell that will be turned off soon. The expanding request may include cell off indication of the source cell.

Conversely, if the source cell decides that it will be turned on soon again, in step S110, the source cell transmits a shrinking request to the target cell that have a role to shrink its coverage, i.e., the second type cell or shrink-and-expand cell described above, for leaving the UEs back to the source cell that will be turned on soon. The shrinking request may include cell on indication of the source cell.

In step S111, the target cell may transmit subsequently an expanding request acknowledge or shrinking request acknowledge to the source cell. The expanding request acknowledge may indicate successful reception of the expanding request. The shrinking request acknowledge may indicate successful reception of the shrinking request.

In step S120, the source cell turns on or turn off according to its decision.

All information exchange described above may be done either through X2 interface (wired) or air interface (wireless) between cells.

Figure 9:
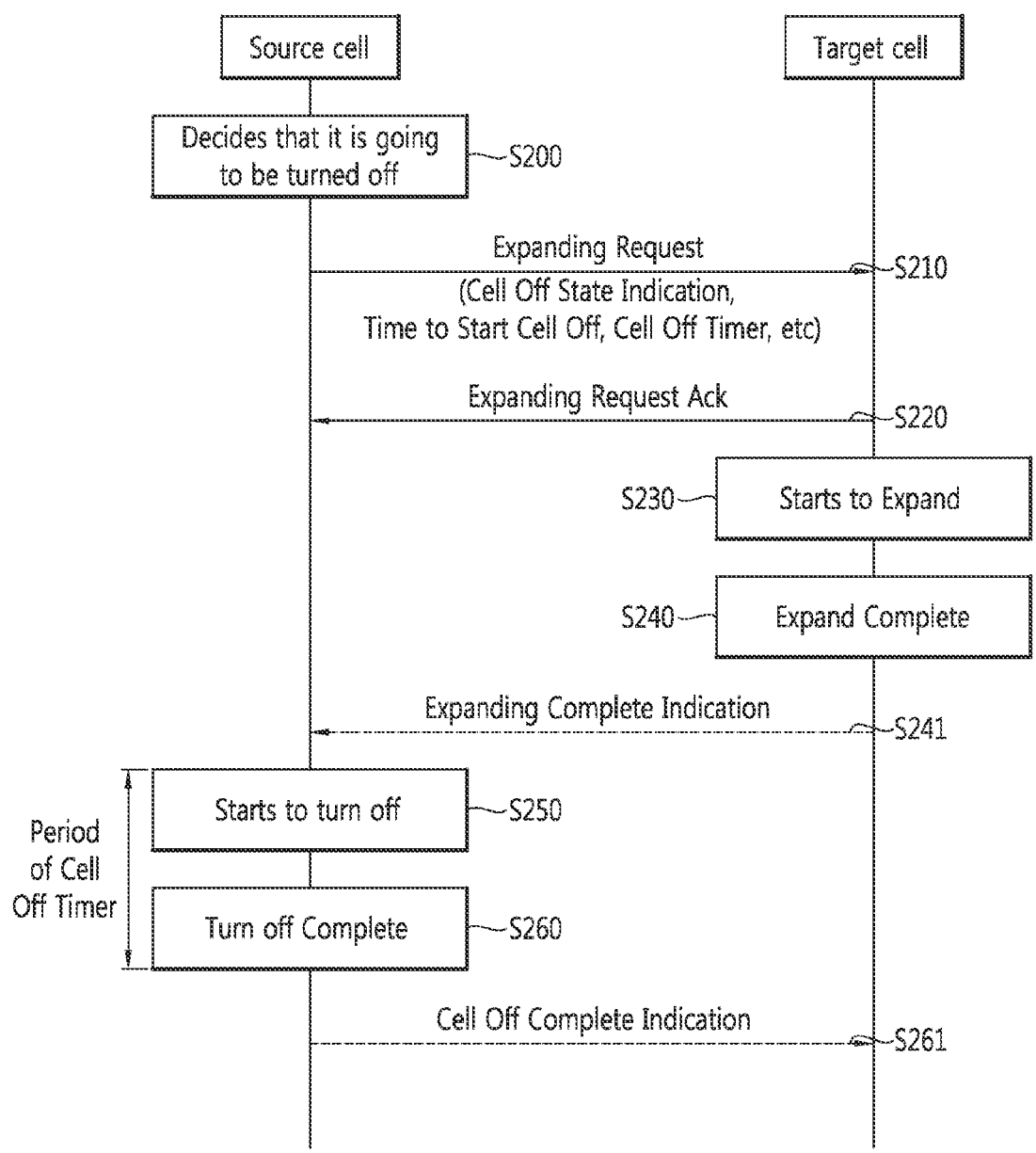
FIG. 9 shows an example of a method for transmitting an expanding request according to an embodiment of the present invention.

FIG. 9 shows an example of a method for transmitting an expanding request according to an embodiment of the present invention.

In step S200, the source cell, which is the first type cell or on-and-off cell described above, decides that it will be turned off soon.

In step 210, the source cell notifies its state change to the target cell, which is the second type cell or shrink-and-expand cell described above, by transmitting an expanding request to the target cell. The expanding request may include at least one of a cell off state indication, time at which the cell off starts, cell off timer and some other necessary information. Also, the expanding request may further include information needed for admission control at the target cell.

The cell off timer may be set by various ways. For example, as described in FIG. 9, the cell off timer may start when the source cell starts to turn its power off. However, regardless of the option described above, the source cell should clearly inform the target cell about when it will finish turning its power off. By using the time at which the cell off starts and cell off timer included in the expanding request, the target cell should finish expanding its coverage before the source cell start turning its power off and should be ready to accommodate UEs served by the source cell.

In step S220, the target cell transmits an expanding request acknowledge, which indicates successful reception of the expanding request, to the source cell.

In step S230, upon receiving the expanding request, the target cell starts expanding its coverage for UEs served by the source cell. In step S240, the expansion of coverage of the target cell is completed. In step S241, when the target cell finishes expanding its coverage, the target cell may transmit an expanding complete indication to the source cell.

In step S250, the source cell starts turning its power off. The cell off timer may start together. In step S260, the source cell finishes turning its power off. In step S261, when the source cell finishes turning its power off, the source cell may transmit a cell off complete indication to the target cell.

Figure 10:
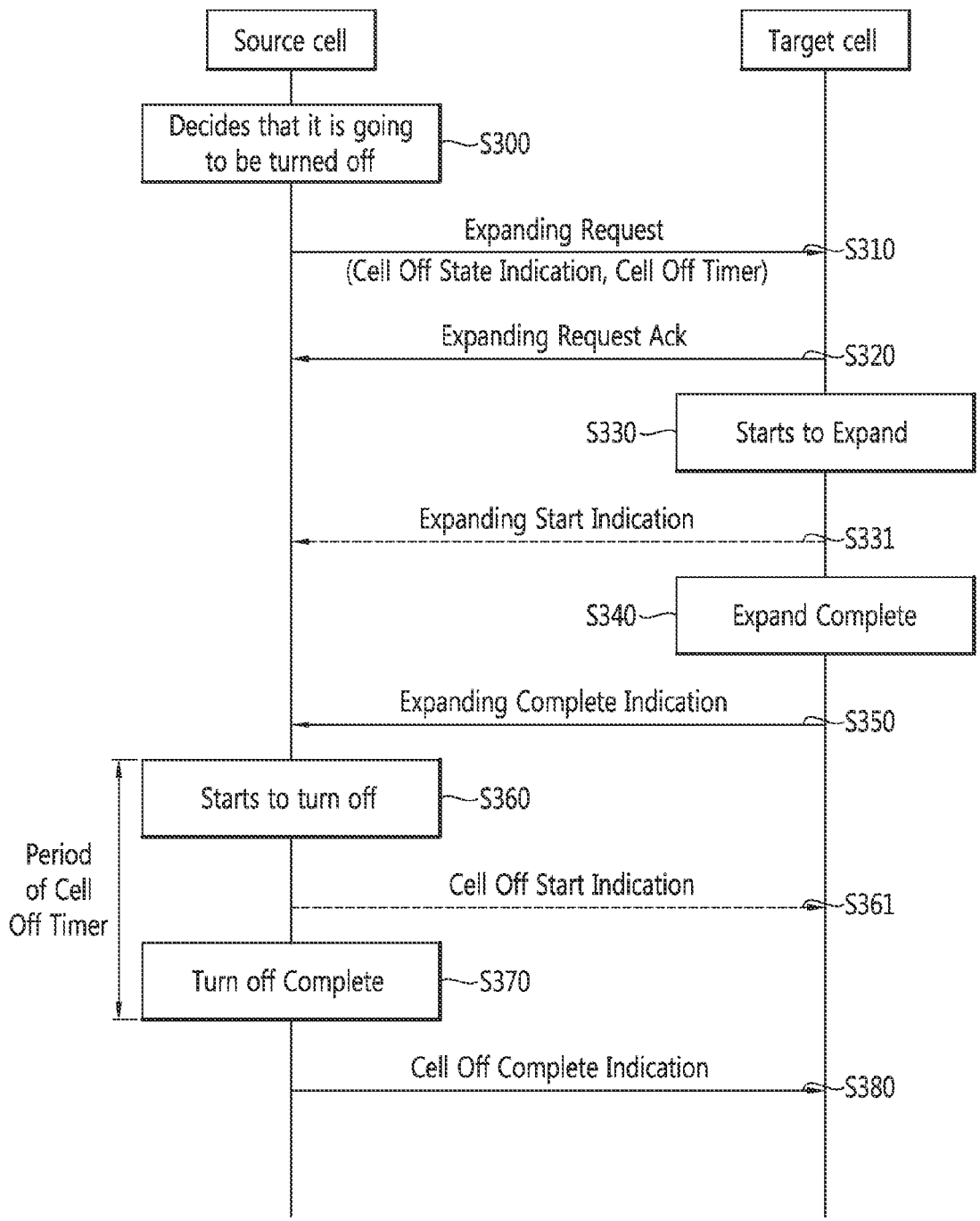
FIG. 10 shows an example of a method for transmitting an expanding request according to another embodiment of the present invention.

FIG. 10 shows an example of a method for transmitting an expanding request according to another embodiment of the present invention.

In step S300, the source cell, which is the first type cell or on-and-off cell described above, decides that it will be turned off soon.

In step 310, the source cell notifies its state change to the target cell, which is the second type cell or shrink-and-expand cell described above, by transmitting an expanding request to the target cell. The expanding request may include at least one of a cell off state indication, cell off timer and some other necessary information. Also, the expanding request may further include information needed for admission control at the target cell.

The cell off timer may be set by various ways. For example, as described in FIG. 10, the cell off timer may start when the source cell starts to turn its power off. However, regardless of the option described above, the source cell should clearly inform the target cell about when it will finish turning its power off. By using the cell off timer included in the expanding request, the target cell should finish expanding its coverage before the source cell start turning its power off and should be ready to accommodate UEs served by the source cell.

In step S320, the target cell transmits an expanding request acknowledge, which indicates successful reception of the expanding request, to the source cell.

In step S330, upon receiving the expanding request, the target cell starts expanding its coverage for UEs served by the source cell. In step S331, when the target cell starts expanding its coverage, the target cell may transmit an expanding start indication to the source cell.

In step S340, the expansion of coverage of the target cell is completed. In step S350, when the target cell finishes expanding its coverage, the target cell transmits an expanding complete indication to the source cell. In comparison with the indication of step S241 of FIG. 9, which is optional, the indication of step S350 is mandatory.

In step S360, the source cell starts turning its power off. The cell off timer may start together. In step S361, when the source cell starts turning its power off, the source cell may transmit a cell off start indication to the target cell.

In step S370, the source cell finishes turning its power off. In step S380, when the source cell finishes turning its power off, the source cell transmits a cell off complete indication to the target cell. In comparison with the indication of step S261 of FIG. 9, which is optional, the indication of step S380 is mandatory.

Figure 11:
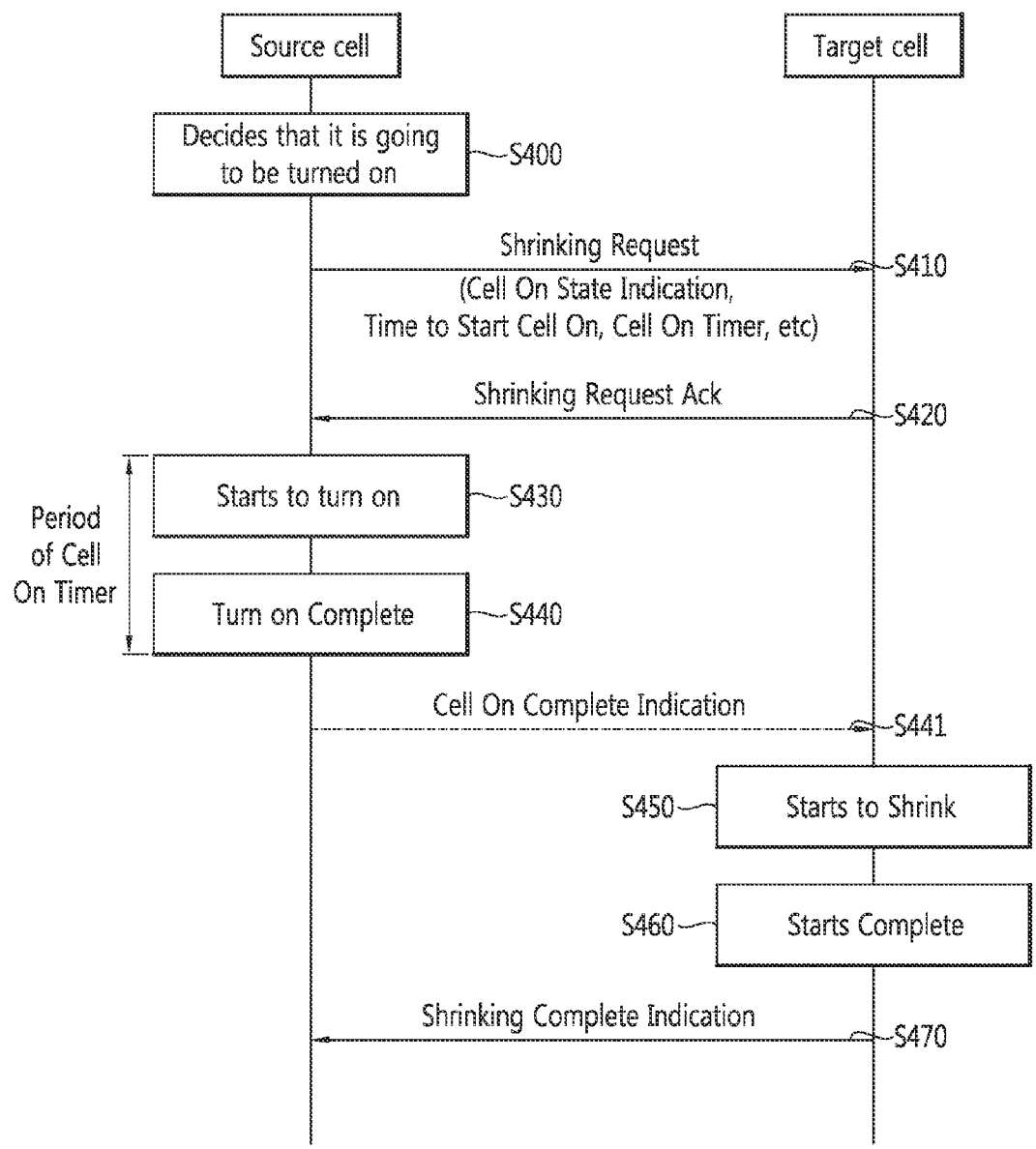
FIG. 11 shows an example of a method for transmitting a shrinking request according to an embodiment of the present invention.

FIG. 11 shows an example of a method for transmitting a shrinking request according to an embodiment of the present invention.

In step S400, the source cell, which is the first type cell or on-and-off cell described above, decides that it will be turned on again soon.

In step 410, the source cell notifies its state change to the target cell, which is the second type cell or shrink-and-expand cell described above, by transmitting a shrinking request to the target cell. The shrinking request may include at least one of a cell on state indication, time at which the cell on starts, cell on timer and some other necessary information. Also, the shrinking request may further include information needed for admission control at the target cell.

The cell on timer may be set by various ways. For example, as described in FIG. 11, the cell on timer may start when the source cell starts to turn its power on. However, regardless of the option described above, the source cell should clearly inform the target cell about when it will finish turning its power on. By using the time at which the cell on starts and cell on timer included in the shrinking request, the target cell should not start shrinking its coverage before the source cell finishes turning its power on and should be ready to accommodate UEs served by the target cell.

In step S420, the target cell transmits a shrinking request acknowledge, which indicates successful reception of the shrinking request, to the source cell.

In step S430, the source cell starts turning its power on. The cell on timer may start together. In step S440, the source cell finishes turning its power on. In step S441, when the source cell finishes turning its power on, the source cell may transmit a cell on complete indication to the target cell.

In step S450, the target cell starts shrinking its coverage. In step S460, the shrinkage of coverage of the target cell is completed. In step S461, when the target cell finishes shrinking its coverage, the target cell may transmit a shrinking complete indication to the source cell.

Figure 12:
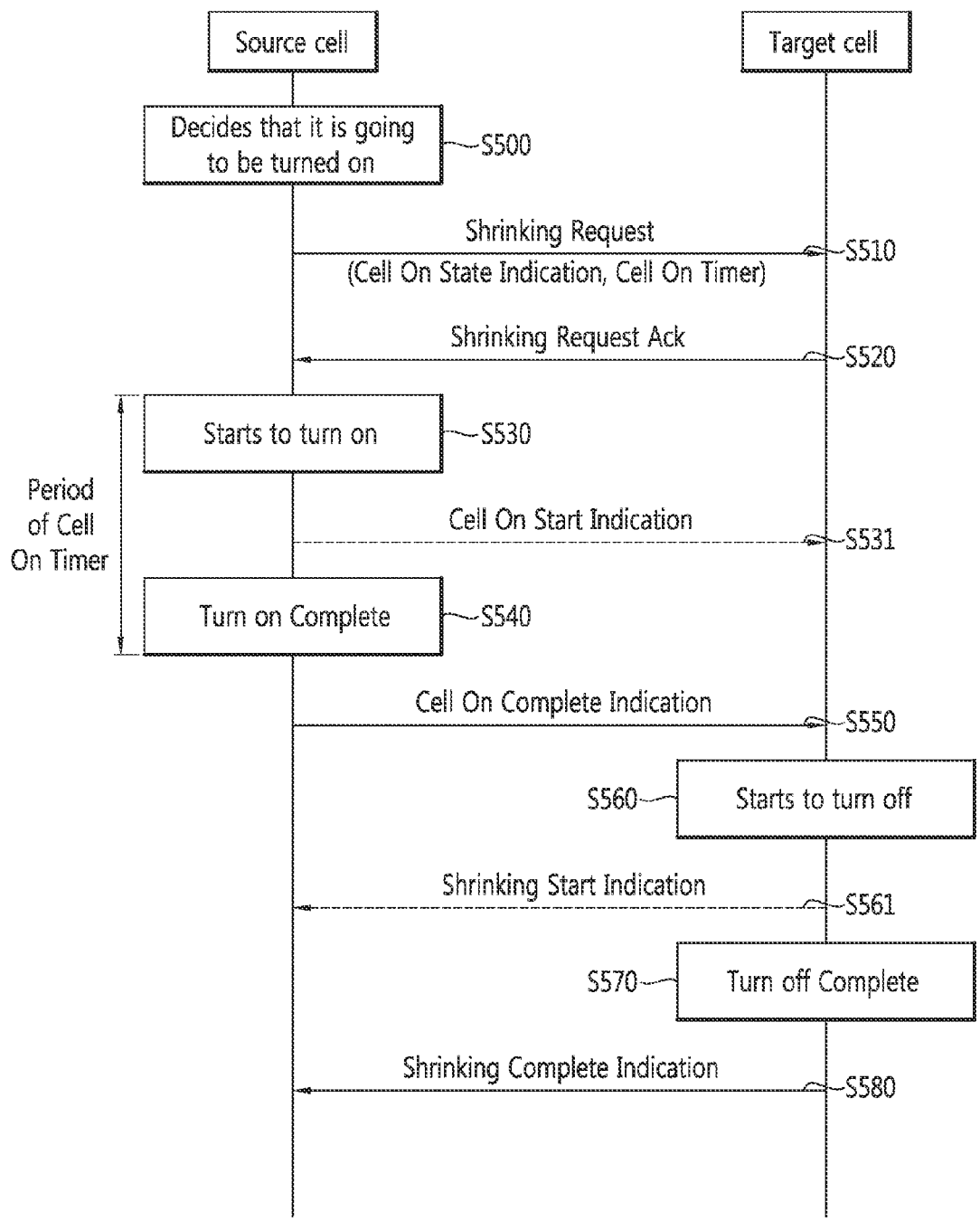
FIG. 12 shows an example of a method for transmitting a shrinking request according to another embodiment of the present invention.

FIG. 12 shows an example of a method for transmitting a shrinking request according to another embodiment of the present invention.

In step S600, the source cell, which is the first type cell or on-and-off cell described above, decides that it will be turned on again soon.

In step 310, the source cell notifies its state change to the target cell, which is the second type cell or shrink-and-expand cell described above, by transmitting a shrinking request to the target cell. The shrinking request may include at least one of a cell on state indication, cell on timer and some other necessary information. Also, the shrinking request may further include information needed for admission control at the target cell.

The cell on timer may be set by various ways. For example, as described in FIG. 12, the cell on timer may start when the source cell starts to turn its power on. However, regardless of the option described above, the source cell should clearly inform the target cell about when it will finish turning its power on. By using the cell on timer included in the shrinking request, the target cell should not start shrinking its coverage before the source cell finishes turning its power on and should be ready to accommodate UEs served by the target cell.

In step S420, the target cell transmits a shrinking request acknowledge, which indicates successful reception of the shrinking request, to the source cell.

In step S430, the source cell starts turning its power on. The cell on timer may start together. In step S431, when the source cell starts turning its power on, the source cell may transmit a cell on start indication to the target cell.

In step S440, the source cell finishes turning its power on. In step S450, when the source cell finishes turning its power on, the source cell transmits a cell on complete indication to the target cell. In comparison with the indication of step S441 of FIG. 11, which is optional, the indication of step S450 is mandatory.

In step S460, the target cell starts shrinking its coverage. In step S461, when the target cell starts shrinking its coverage, the target cell may transmit a shrinking start indication to the source cell.

In step S470, the shrinkage of coverage of the target cell is completed. In step S480, when the target cell finishes shrinking its coverage, the target cell transmits a shrinking complete indication to the source cell. In comparison with the indication of step S461 of FIG. 11, which is optional, the indication of step S480 is mandatory.

Figure 13:
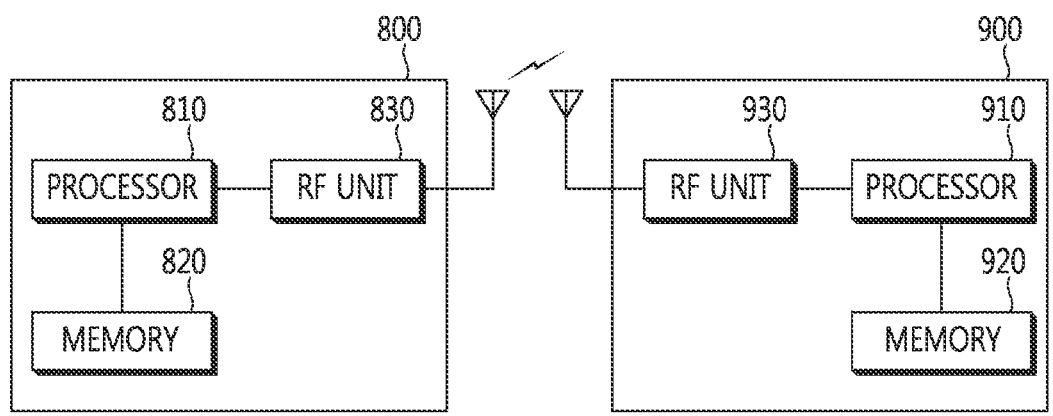
FIG. 13 shows a wireless communication system to implement an embodiment of the present invention.

FIG. 13 shows a wireless communication system to implement an embodiment of the present invention.

A first eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, dynamic turn on/off of small cells can be performed efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first cell, an expanding request in a wireless communication system, the method comprising:

transmitting an expanding request, which includes a cell off state indication which indicates the first cell is going to be turned off, and a period of a cell off timer, to a second cell;

receiving an expanding request acknowledge as a response to the expanding request from the second cell;

receiving an expanding start indication from the second cell when the second cell starts expanding coverage of the second cell according to the expanding request;

receiving an expanding complete indication from the second cell when the second cell finishes expanding coverage of the second cell;

after receiving the expanding complete indication from the second cell, starting the cell off timer at the first cell based on the period of the cell off timer;

after starting the cell off timer, transmitting a cell off start indication to the second cell when the first cell starts turning off power; and after the cell off timer expires, transmitting a cell off complete indication to the second cell when the first cell finishes turning off power.

2. The method of claim 1, wherein the expanding request further includes time at which the first cell starts turning off power.

3. The method of claim 1, further comprising:
transmitting information on a type of the first cell to the second cell via X2 interface.

4. The method of claim 1, wherein the first cell starts turning off power after the second cell finishes expanding coverage of the second cell.

5. The method of claim 1, wherein the first cell and the second cell are small cells.

6. A first cell device configured to transmit an expanding request in a wireless communication system, the first cell device comprising:
a memory;
a radio frequency device; and
a processor operatively connected to the memory and the radio frequency device, the processor configured to:

transmit an expanding request, which includes a cell off state indication which indicates the first cell is going to be turned off, and a period of a cell off timer, to a second cell;
receive an expanding request acknowledge as a response to the expanding request from the second cell;
receive an expanding start indication from the second cell when the second cell starts expanding coverage of the second cell according to the expanding request;
receive an expanding complete indication from the second cell when the second cell finishes expanding coverage of the second cell;
after receiving the expanding complete indication from the second cell, start the cell off timer at the first cell based on the period of the cell off timer;
after starting the cell off timer, transmit a cell off start indication to the second cell when the first cell starts turning off power; and
after the cell off timer expires, transmit a cell off complete indication to the second cell when the first cell finishes turning off power.

* * * * *